(No Model.)
F. G. WATERHOUSE.
DYNAMO ELECTRIC MACHINE.
No. 332,685. Patented Dec. 15, 1885.
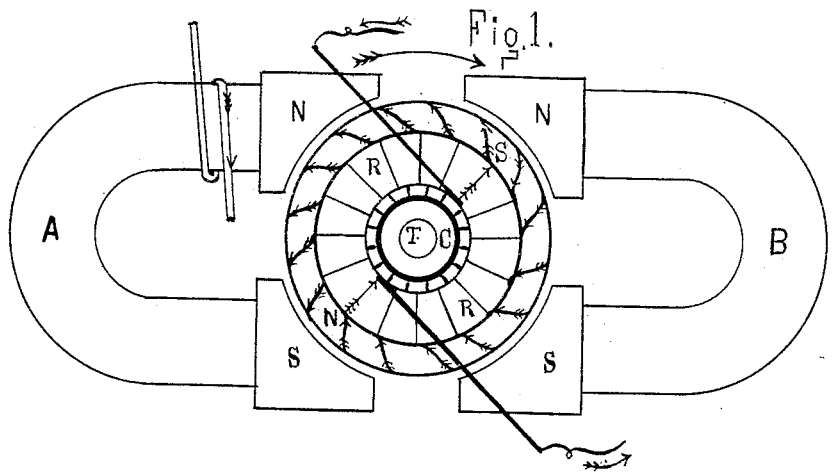
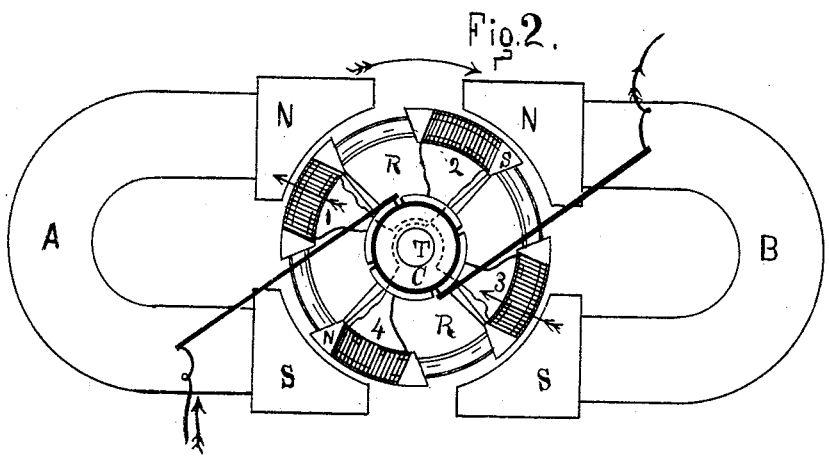
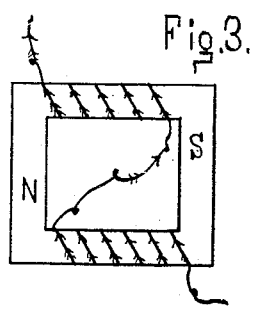
WITNESSES,
R. M. Hayden
A. G. Waterhouse
INVENTOR,
Frank G. Waterhouse
by his attorney
A. G. Waterhouse ated December 15, 1885.

UNITED STATES PATENT OFFICE.

FRANK G. WATERHOUSE, OF SACRAMENTO CITY, CALIFORNIA.

DYNAMO-ELECTRIC MACHINE.

SPECIFICATION forming part of Letters Patent No. 332,685, dated December 15, 1885.

Application filed June 17, 1884. Serial No. 135,102. (No model.)

*To all whom it may concern:*

Be it known that I, FRANK G. WATERHOUSE, of the city of Sacramento, State of California, have invented a new and useful Improvement in Dynamo-Electric Machines, of which the following is a description, reference being had to accompanying drawings and letters marked thereon.

My invention consists in a novel arrangement of the field-magnet pole-pieces, between which the armature rotates, and in the method of taking off the current from the commutator, so that the current generated by the armature will produce a certain magnetic effect upon the iron composing the armature, which magnetism will be imparted to the field-magnet, and returned back to the armature at a point where the current is generated by means of the conductors on the armature crossing the lines of force related to such return magnetism.

In order to more fully describe my invention, we will first refer to the accompanying drawings.

Figure 1 is an elevation of a generator, showing an end view of an armature surrounded by the four poles of two magnets, A and B. In this figure the armature R is wound with an endless coil of wire all around its circumference. C is its commutator, which is connected to the wire on the armature R by radial conductors, which connect the wire on R at even intervals apart, to separate insulated strips of the commutator, and is of that class known as "closed-circuit" armature or "Gramme ring."

Fig. 2 is the same as Fig. 1, except in it is shown an armature of what is known as the "open-circuit" type; and it consists of separate coils of conductors wound on the armature R, such as the four coils shown and marked 1, 2, 3, and 4. One of the free ends of the conductors composing each of these coils is connected to a separate plate in the commutator C, the other free ends of each coil are bunched or connected together in a common connection, or each pair of opposite bobbins can be electrically connected together; or, in fact, any of the connections or ways known to the present state of the art, and known as the "open-circuit" style can be used.

Fig. 3 is a sketch used to explain the magnetic effect of a current in the conductors of an armature upon the iron composing the same.

By referring to Fig. 3 it will be seen that if a coil of wire was wound around two opposite sides of an endless bar of iron formed in the shape of a square, and if a current was passed through such wire in the direction of the small darts, the magnetic effect of such a current would be to magnetize the iron, so that its north pole would be at the side marked N, and its south pole would be as marked S. If this square iron were formed into a round ring, the same as a ring-armature, and the wire placed upon it the same as on Fig. 3, a current passing through the wire, the same as shown, would have the same magnetic effect, and the side of the armature to the left of the direction of the current would be a north pole, while the opposite side would be a south pole.

With this explanation I will proceed to explain the effect of a current in the conductors of an armature in magnetizing the iron composing the same, and in using such magnetism to excite or magnetize the field-magnet, which in return presents magnetic pole-pieces to the armature, by means of which currents are generated in the same. It has been shown that a current passing around a square or circular piece of iron in the way shown in Fig. 3 will magnetize the ring or iron so that one side will be of a north polarity and the other side will be of a south polarity, so with this in view we will refer to Fig. 1. Now, suppose a current was passing through the upper brush to the commutator C. It would then pass out through the radial conductor marked with an arrow and connect to the strip in the commutator upon which the brush is in contact. The current therefore would pass out to the coils or conductor on the armature (shown in this case by small arrows) and divide in two parts, going around the armature on both sides, in the direction shown by arrows, until they meet again and join at the radial conductor marked with an arrow, and leading to the commutator-strip in contact with the lower brush, through which the current would pass from the armature. Now, the effect of this current on the iron of the armature R would be to magnetize it so that the side marked N would be of a north polarity, and the opposite side (marked S) would be of a south polarity. The effect of these two poles in the armature would be to cause the north pole of the armature to induce a south pole in the lower arm of the magnet A, while the south pole of the armature would induce a north pole in the upper arm of the magnet B. From this point we will describe one side of the armature R and magnet A. The other side we will omit, as it would be only a repetition. If, as stated, the north pole of the armature R made the lower arm of A south, as marked S, the upper arm of A would be a consequent north pole. Therefore the magnetism in the armature would produce a magnetism in A possessing a north and south pole, as shown. Now, if the armature R were revolved rapidly in the direction of the large arrow at the top, and the brushes and angles of the taking on and off of the current should remain the same, the effect would be to cause a current to be generated in the wire on the armature in the same direction as that shown by the small darts. While passing the north pole of magnet A this current would consequently increase the strength of the magnetism of all the parts, as shown, and the magnetism in return would strengthen the current thereby produced, and in the same manner a current would be originated from a small residual magnetism in the magnets A and B, which would increase their magnetism, and they in return increase the current, so that the need of electro-magnetic fields could be partly, if not entirely, dispensed with. Of course any increase of magnetism caused by using an electric current around the magnets A and B would only add to their strength and not be a departure from this invention.

As I have only described the use of magnet A, it will easily be seen that the same description will apply to magnet B by using the signs of polarity as marked on the drawings.

In Fig. 2 is shown the same invention applied to an open-circuit form of armature, in which are shown four bobbins or coils of wire on the armature R, (marked 1, 2, 3, and 4.) The armature is supposed to be revolving in the direction shown by the large arrow at the top. The two contact-brushes are in contact with the two plates of the commutator C, which are connected to the coils 1 and 3. The coils 2 and 4 are cut out of circuit at this time. The current is being generated in coils 1 and 3 while they are passing the two poles, as shown—that is, the north pole of magnet A and the south pole of magnet B—which current flows in the direction shown by arrows placed across the coils 1 and 3. The result of this current is to magnetize the iron of the armature R, as marked N and S. This magnetism induces a magnetism of a south polarity in magnet A, and one of a north polarity in magnet B, which results in the two consequent poles—that is, the north pole of B, by passing which a current is produced in coil 1, and the south pole or B, by which a current is produced in coil 3.

It will be plainly seen that this invention can be applied to an armature of the cylinder type as well as the ring form or Gramme; and it makes no difference whether the field-magnets are simply permanent magnets, or soft iron with sufficient residual magnetism in to start the current, or strong electro-magnets produced by either an independent current or a branch of the main current produced by the armature or the current itself; nor does it differ whether the magnets are permanent or electro magnets, or both.

I have attempted to show the true position of the brushes for taking on and off the current from the armature in order to attain the best results gained, as above described; but in practice it will be found that a certain deflection of the neutral line will occur, which will necessitate a change in the position of the brushes between the point shown in the drawings and toward the neutral line caused by the two north and two south poles of the field-magnets; but any deflection which may occur will be much less than that which is common to machines with but two pole-pieces.

What I claim as my invention is—

1. In a dynamo-electric machine, the combination of two separate field-magnets each provided with two separate pole-pieces, a rotary armature and commutator and connections, substantially as described, the poles of the armature being arranged adjacent to the opposite poles of the two field-magnets, whereby the said armature-poles act inductively upon the adjacent poles of the field-magnets, and strengthen the poles at the opposite end of the magnets.

2. In a dynamo-electric machine, the combination of two separate field-magnets, each provided with two separate pole-pieces, the like poles of the magnets being opposite each other, a rotary armature and commutator, and connections substantially as described, the poles of the armature being arranged adjacent to the opposite poles of the two field-magnets, as and for the purpose set forth.

3. In a dynamo-electric machine, the combination of two separate horsehoe field-magnets, the like poles of the two magnets being arranged opposite each other, a closed-circuit armature and commutator, and connections, substantially as described, whereby the armature-poles act inductively upon the adjacent poles of the field-magnet and strengthen the poles at the opposite ends.

FRANK G. WATERHOUSE.

Witnesses:
JAMES M. HENDERSON,
J. F. H. FORBES.